US009503536B2

(12) United States Patent
Bosworth et al.

(10) Patent No.: US 9,503,536 B2
(45) Date of Patent: Nov. 22, 2016

(54) METHODS AND APPARATUS TO MONITOR MEDIA PRESENTATIONS

(71) Applicant: The Nielsen Company (US), LLC, New York, NY (US)

(72) Inventors: Alan N. Bosworth, Oldsmar, FL (US); Albert T. Borawski, Oldsmar, FL (US); Scott Cooper, Oldsmar, FL (US); Kevin K. Gaynor, Stockton, CA (US)

(73) Assignee: The Nielsen Company (US), LLC, New York, NY (US)

( * ) Notice: Subject to any disclaimer, the term of this patent is extended or adjusted under 35 U.S.C. 154(b) by 156 days.

(21) Appl. No.: 13/828,971

(22) Filed: Mar. 14, 2013

(65) Prior Publication Data

US 2014/0280874 A1    Sep. 18, 2014

(51) Int. Cl.
*H04L 29/08* (2006.01)
*G06F 21/62* (2013.01)

(52) U.S. Cl.
CPC ........... *H04L 67/22* (2013.01); *G06F 21/6245* (2013.01)

(58) Field of Classification Search
CPC .... H04L 67/22; H04L 12/26; G06F 21/6245
See application file for complete search history.

(56) References Cited

U.S. PATENT DOCUMENTS

| | | | |
|---|---|---|---|
| 5,812,398 A * | 9/1998 | Nielsen | 705/1.1 |
| 6,052,730 A | 4/2000 | Felciano et al. | |
| 6,108,637 A | 8/2000 | Blumenau | |
| 6,112,240 A | 8/2000 | Pogue et al. | |
| 6,873,688 B1 | 3/2005 | Aarnio | |
| 7,127,305 B1 | 10/2006 | Palmon | |
| 7,167,842 B1 | 1/2007 | Josephson, II et al. | |
| 7,260,837 B2 | 8/2007 | Abraham et al. | |
| 7,323,991 B1 | 1/2008 | Eckert et al. | |
| 7,386,625 B2 | 6/2008 | D'Aviera | |
| 7,493,655 B2 | 2/2009 | Brown | |
| 7,587,732 B2 * | 9/2009 | Wright | G06Q 30/02 348/552 |
| 7,729,940 B2 | 6/2010 | Harvey et al. | |

(Continued)

FOREIGN PATENT DOCUMENTS

| | | |
|---|---|---|
| CN | 102289758 | 12/2011 |
| EP | 2278543 | 1/2011 |

(Continued)

OTHER PUBLICATIONS

Microsoft and National White Collar Crime Center Make Digital Forensics Tool Available to U.S. Law Enforcement Agencies, Oct. 13, 2009, 2 pages, Redmond, WA.

(Continued)

*Primary Examiner* — Ebrahim Golabbakhsh
(74) *Attorney, Agent, or Firm* — Hanley, Flight & Zimmerman, LLC

(57) ABSTRACT

Methods, apparatus, systems and articles of manufacture to monitor media presentations are disclosed. An example method includes collecting demographic information from a user. The demographic information is transmitted to a central facility. A panelist identifier identifying the user is generated. The panelist identifier is stored in a shared memory of the media device, the panelist identifier to be retrieved by a monitoring enabled application, the monitoring enabled application to collect monitoring information if the panelist identifier is in the shared memory and to disable collection of the media monitoring information if the panelist identifier is not in the shared memory.

46 Claims, 6 Drawing Sheets

(56) References Cited

U.S. PATENT DOCUMENTS

| | | | |
|---|---|---|---|
| 7,930,285 | B2 | 4/2011 | Abraham et al. |
| 8,000,993 | B2 | 8/2011 | Harvey et al. |
| 8,112,301 | B2 | 2/2012 | Harvey et al. |
| 8,370,489 | B2 | 2/2013 | Mazumdar et al. |
| 8,387,084 | B1 | 2/2013 | Klappert et al. |
| 8,635,334 | B2 | 1/2014 | Malloy et al. |
| 8,819,109 | B1* | 8/2014 | Krishnamurthy . G06F 17/30905 709/203 |
| 2002/0128908 | A1* | 9/2002 | Levin ............... G06Q 30/02 705/14.53 |
| 2003/0126146 | A1 | 7/2003 | Van Der Riet |
| 2003/0177488 | A1 | 9/2003 | Smith et al. |
| 2004/0088212 | A1 | 5/2004 | Hill |
| 2004/0252816 | A1 | 12/2004 | Nicolas |
| 2006/0203106 | A1 | 9/2006 | Lawrence et al. |
| 2009/0034606 | A1 | 2/2009 | MacInnis |
| 2009/0307061 | A1 | 12/2009 | Monighetti et al. |
| 2010/0145954 | A1* | 6/2010 | Barlin ............... G06F 17/3087 707/754 |
| 2010/0197326 | A1* | 8/2010 | Ngo ................. G06F 8/65 455/466 |
| 2011/0010470 | A1 | 1/2011 | Hulbert et al. |
| 2011/0072039 | A1 | 3/2011 | Tayloe |
| 2011/0087530 | A1 | 4/2011 | Fordyce, III et al. |
| 2011/0088059 | A1 | 4/2011 | Wilson et al. |
| 2011/0093324 | A1 | 4/2011 | Fordyce, III et al. |
| 2011/0093335 | A1 | 4/2011 | Fordyce, III et al. |
| 2011/0153391 | A1 | 6/2011 | Tenbrock |
| 2011/0179204 | A1 | 7/2011 | Hulbert et al. |
| 2011/0264501 | A1 | 10/2011 | Clyne |
| 2011/0264567 | A1 | 10/2011 | Clyne |
| 2012/0042367 | A1 | 2/2012 | Papakostas et al. |
| 2012/0078727 | A1 | 3/2012 | Lee |
| 2012/0118947 | A1 | 5/2012 | Lyons et al. |
| 2012/0260280 | A1 | 10/2012 | Harsh et al. |
| 2012/0290950 | A1 | 11/2012 | Rapaport et al. |
| 2013/0007794 | A1 | 1/2013 | Besehanic et al. |
| 2013/0014145 | A1 | 1/2013 | Bhatia et al. |
| 2013/0104038 | A1* | 4/2013 | Galper ............... G06F 17/30887 715/271 |
| 2013/0111511 | A1* | 5/2013 | Besehanic ............... 725/14 |
| 2013/0198383 | A1 | 8/2013 | Tseng et al. |
| 2013/0198512 | A1 | 8/2013 | Rubin et al. |
| 2013/0326554 | A1* | 12/2013 | Shkedi ............... 725/34 |
| 2014/0081750 | A1 | 3/2014 | Hosp |
| 2014/0110468 | A1 | 4/2014 | Kandregula |
| 2014/0149586 | A1 | 5/2014 | Clapp et al. |
| 2014/0149588 | A1 | 5/2014 | DeHaas et al. |
| 2014/0215050 | A1 | 7/2014 | Lu |
| 2014/0244352 | A1 | 8/2014 | Fordyce, III et al. |
| 2014/0259032 | A1 | 9/2014 | Zimmerman |
| 2014/0280888 | A1 | 9/2014 | McMillan |
| 2014/0325057 | A1 | 10/2014 | Borawski et al. |
| 2015/0052245 | A1 | 2/2015 | McMillan |
| 2015/0186536 | A1 | 7/2015 | Bosworth et al. |

FOREIGN PATENT DOCUMENTS

| | | |
|---|---|---|
| KR | 20010039360 | 5/2001 |
| WO | 2005071961 | 8/2005 |
| WO | 2006017624 | 2/2006 |
| WO | 2012128895 | 9/2012 |
| WO | 2012177872 | 12/2012 |
| WO | 2014160332 | 10/2014 |
| WO | 2014176442 | 10/2014 |
| WO | 2015102796 | 7/2015 |

OTHER PUBLICATIONS

Ben Gaines, "Under the Hood with Visits and Visitors," Mar. 24, 2009, 8 pages, Omniture: Industry Insights.

Glenn Fleishman, "Web Log Analysis: Who's Doing What, When?" May/Jun. 1996, 3 pages, vol. 2, No. 2, Webdeveloper.com.

Appendix C, Netscape Cookies, http://developer1.netscape.com/docs/manuals/communicator/jsguide4/cookies.htm, Aug. 11, 2004, 6 pages.

"Forum OpenACS Q&A: How to uniquely identify user's PC without using IP address?" Sep. 1, 2003, 3 pages, OpenACS.

International Searching Authority, "International Search Report and Written Opinion", issued in connection with International Application No. PCT/US2014/02016, dated Jul. 11, 2014 (13 pages).

U.S. Appl. No. 13/836,096, "Methods, Apparatus and Articles of Manufacture to Monitor Media Devices," application as filed, Mar. 15, 2013, 53 pages.

U.S. Appl. No. 14/453,840, "Methods and Apparatus to Monitor Media Presentations", application as filed, Aug. 7, 2014, 57 pages.

U.S. Appl. No. 14/145,452, "Methods and Apparatus to Create a Panel of Media Device Users," application as filed, Dec. 31, 2013, 66 pages.

International Searching Authority, "International Search Report & Written Opinion", issued in connection with International Patent Application No. PCT/US2014/035331, dated Aug. 21, 2014 (11 pages).

Dodson, "PBS Comes to Apple TV, Are the Networks Next?" Nov. 19, 2013, 3 pages.

International Searching Authority, "International Search Report & Written Opinion", issued in connection with International Application No. PCT/US2014/026336, dated Jul. 17, 2014 (14 pages).

United States Patent and Trademark Office, "Non-Final Office Action", issued in connection with U.S. Appl. No. 13/836,096, dated Apr. 24, 2015 (15 pages).

IP Australia, "Examination Report", issued in connection with Australian Patent Application No. 2013204917, dated Mar. 24, 2015 (5 pages).

IP Australia, "Examination Report", issued in connection with Australian Patent Application No. 2013204913, dated May 5, 2015 (4 pages).

United States Patent and Trademark Office, "Non-Final Office Action", issued in connection with U.S. Appl. No. 14/527,283, dated Jun. 5, 2015 (14 pages).

International Searching Authority, "International Search Report," issued in connection with International Patent Application No. PCT/US2014/068353, dated Feb. 26, 2015 (3 pages).

International Searching Authority, "Written Opinion," issued in connection with International Patent Application No. PCT/US2014/068353, dated Feb. 26, 2015 (6 pages).

Patent Cooperation Treaty, International Preliminary Report on Patentability, issued in connection with Application No. PCT/US2014/026016, Sep. 24, 2015, 10 pages.

United States Patent and Trademark Office, Final Office Action, issued in connection with U.S. Appl. No. 14/527,283, dated Oct. 21, 2015 (12 pages).

United States Patent and Trademark Office, Final Office Action, issued in connection with U.S. Appl. No. 13/836,096, dated Nov. 18, 2015 (16 pages).

Korean Intellectual Property Office, Notice of Preliminary Rejection, issued in connection with application No. 10-2014-7034015, Nov. 13, 2015, 12 pages.

Canadian Intellectual Property Office, Office Action, issued in connection with Canadian Patent Application No. 2,875,218, on Jan. 26, 2016, (5 pages).

Japanese Patent Office, Notice of Reasons for Rejection, issued in connection with Japanese Patent Application No. P2015-525651, on Mar. 7, 2016, (8 pages).

Takemori, T. et al., "Management Techniques for Universally Unique Identifier for Applications in Smart Phone," Special Interest Group Technical Reports of IPSJ, 2012, 5, "CD-ROM," Japan, Information Processing Society of Japan, Feb. 15, 2013, (10 pages) (English Abstract Included). An english machine translation retrieved from "https://translate.google.com/" is also provided, (8 pages).

State Intellectual Property Office of China, First Office Action, issued in connection with application No. CN 201480001438.X, on Aug. 26, 2016, 9 pages. (including English Translation).

* cited by examiner

METHODS AND APPARATUS TO MONITOR MEDIA PRESENTATIONS

FIELD OF THE DISCLOSURE

This disclosure relates generally to audience measurement, and, more particularly, to methods and apparatus to monitor media presentations.

BACKGROUND

In recent years, consumer devices have been provided with Internet connectivity and the ability to retrieve media from the Internet. As such, media exposure has shifted away from conventional methods of presentation, such as broadcast television, towards presentation via consumer devices accessing the Internet to retrieve media for display.

Media providers and/or other entities such as, for example, advertising companies, broadcast networks, etc. are often interested in the viewing, listening, and/or media behavior of audience members and/or the public in general. To monitor these behavior, an audience measurement company may enlist panelists (e.g., persons agreeing to be monitored) to cooperate in an audience measurement study. The media usage and/or exposure habits of these panelists as well as demographic data about the panelists is collected and used to statistically determine the size and demographics of a larger audience of interest.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
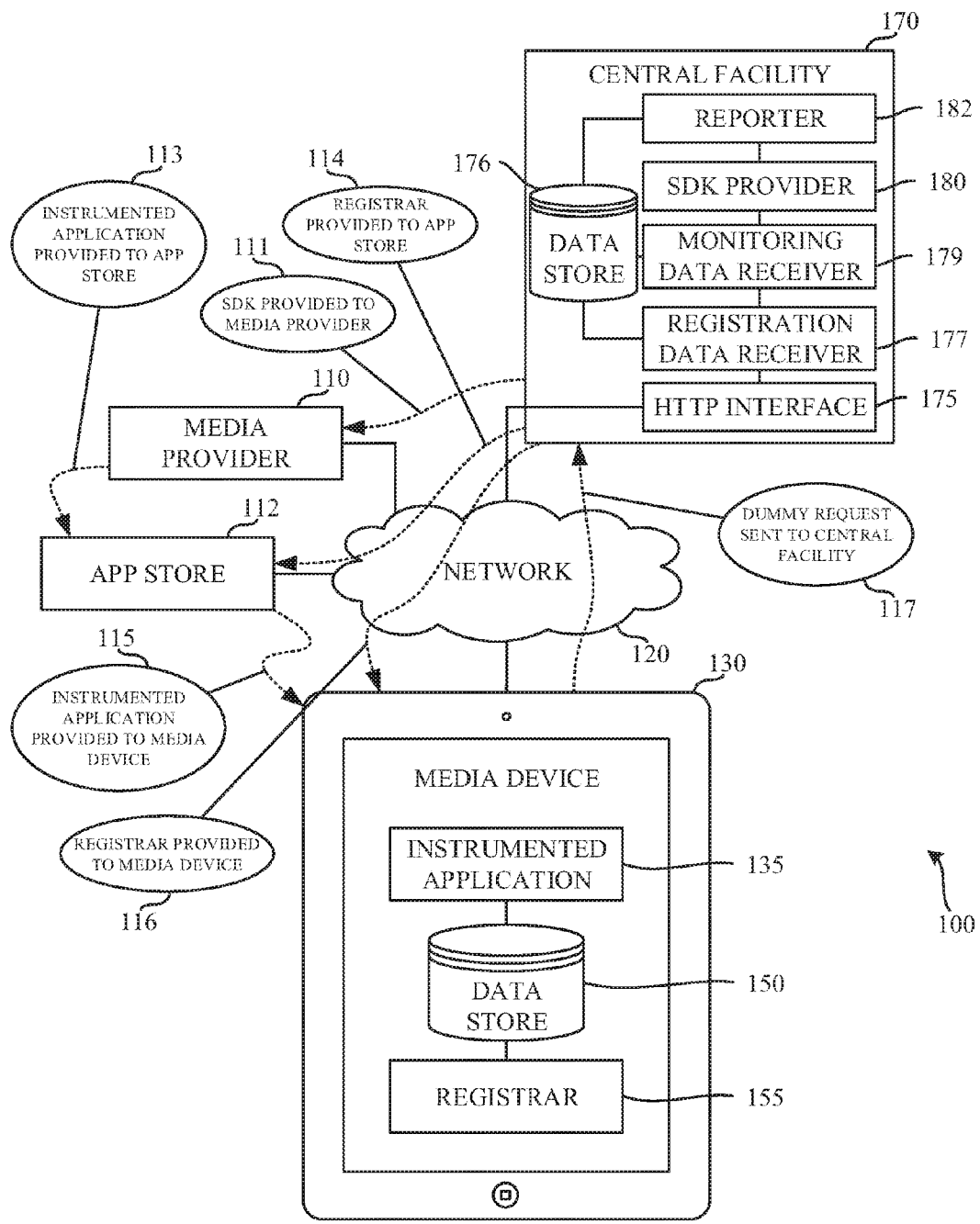
FIG. 1 is a block diagram of an example system constructed in accordance with the teachings of this disclosure to monitor media presentations.

Monitoring companies desire to gain knowledge on how users interact with media devices such as smartphones, tablets, laptops, smart televisions, etc. In particular, the media monitoring companies want to monitor media presentations made at the media devices to, among other things, monitor exposure to advertisements, determine advertisement effectiveness, determine user behavior, identify purchasing behavior associated with various demographics, etc.

As used herein, the term "media" includes any type of content and/or advertisement delivered via any type of distribution medium. Thus media includes television programming or advertisements, radio programming or advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation® 3), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a panelist identifier, a username, etc.).

Media devices such as tablet computers (e.g., an Apple iPad®, an Asus Transformer™, etc.) present media using applications (sometimes referred to as "apps") that access, retrieve, request, and/or present media (e.g., Internet media). Many different "Apps" exist and can be downloaded by users through app stores such as, for example, Apple iTunes®, Google Play®, etc. Hundreds, if not thousands, of apps are available in the app stores that enable presentation of media. Examples of such applications include, but are not limited to, Hulu®, Netflix®, HBO Go®, etc.

Operating systems used on media devices are often closed platforms. That is, the operating systems provide a limited set of functions that applications executed by the media device can access via, for example, an Application Programming Interface (API). In some operating systems, only a single application is executed at one time. When the media device executes the app, the app is typically run in a "sand-box." That is, the app is not allowed to communicate with other apps executed by the media device. In some examples, apps have access to a limited set of functionality for sharing data with other apps. For example, applications executed on the iOS operating system have access to a "pasteboard" that allows applications to share information.

Because communicating with applications to identify and/or monitor media presentation events on devices using a "sandbox" approach is difficult, in examples disclosed herein monitoring is enabled by adding monitoring capability to applications. In examples disclosed herein, a software development kit (SDK) is provided to application developers from, for example, an audience measurement entity. The SDK facilitates instrumenting and/or otherwise enabling applications (e.g., media applications (such as streaming video applications), news applications, browser applications, image applications, social media applications, games, etc.) with monitoring functionalities which are able to collect and transmit monitoring information to a monitoring entity. In particular, the application developers create apps that include media monitoring functionality using the SDK. Accordingly, rather than relying on a dedicated monitoring application installed on a panelist computer (e.g., a tablet, a laptop, a smartphone, etc.), instrumented applications disclosed herein are instrumented with instructions such that the instant apps effectively monitor themselves and/or user interaction(s) with the instrumented apps. In some examples, the instrumented application is referred to as a monitoring enabled application. Because the instrumented applications monitor themselves, the instrumented applications and/or the monitoring functionality provided by the SDK enables the instrumented application to, for example, notify the central facility when an app and/or media associated with the app is presented, notify the central facility what media and/or app(s) is presented, notify the central facility how the apps and/or media is being presented (e.g. via a tablet display, via a television, etc.), notify the central facility of a duration of exposure of an app and/or media associated with the app, etc. In some examples, the media monitoring functionality may be triggered by, for example presentation of a media element such as, for example, a video, audio, and image, etc.

However, just because media monitoring functionality is implemented by the application does not mean that the user has consented to be monitored. Therefore, to protect the privacy of persons not agreeing to be monitored, it is desirable to seek consent before monitoring. In principle, such consent could be gathered by every application instrumented with monitoring functionality by causing each such instrumented application to ask the user for permission to enable monitoring. However, on devices that may include many apps, the user would be asked for their permission many times. Repeatedly asking the user for their permission to enable monitoring may discourage the user from consenting to the monitoring. Furthermore, in order to marry demographic information with media exposure and/or app usage data, it is necessary to obtain such demographic information from the user. In principle, it is possible to request such demographic information whenever asking a user for permission to monitor. However, repeatedly asking the user for their permission and/or repeatedly asking the user to re-enter their demographic information is cumbersome to the user and may discourage the user from enabling monitoring. In examples disclosed herein the instrumented apps to not directly ask the user for consent to be monitored and/or further demographic information. Rather, a single registrar (sometimes referred to as a registration application) requests consent from the user to enable monitoring and collects demographic information from the user. An indication of the consent (e.g., a consent indicator) to monitoring is then stored in a shared memory location of the media device (e.g., a pasteboard, a register, a data file, etc.). The collected demographic information is transmitted by the registration application to the monitoring entity. As disclosed herein, this one registration event serves as consent to monitoring by instrumented applications. In particular, applications with monitoring functionality (e.g., instrumented applications) do not ask the user for consent, but instead check for the consent indicator on, for example, the pasteboard, etc. If the consent indicator is present and indicates consent, the monitoring functionality of the app is activated. If the consent indicator is not present and/or does not indicate consent, the monitoring functionality of the apps is disabled and/or not executed.

Consider for example, a media application instrumented with monitoring functionality. Assume the instrumented application has been downloaded to a media device (e.g., via purchase in an app store). During operation of the instrumented media application, the media application identifies whether the user has given their permission to be monitored. In examples disclosed herein, the media application checks the shared memory location to determine if such consent has been given. When the instrumented application accesses the shared memory location for the consent indicator, the instrumented application also retrieves a panelist identifier (if present) associated with the monitored media presentation. The panelist identifier is used to associate the media activity of the media device with the panelist. In some examples, the panelist identifier is the consent identifier.

FIG. 1 is a block diagram of an example system 100 constructed in accordance with the teachings of this disclosure to monitor media and/or apps. The example system 100 of FIG. 1 includes a media device 130 and a central facility 170. The media device 130 of the illustrated example includes a instrumented application 135, a data store 150, and a registrar 155. The example central facility 170 of the illustrated example of FIG. 1 includes an HTTP interface 175, a registration data receiver 177, a data store 176, a monitoring data receiver 179, a software development kit (SDK) provider, and a reporter 182. The example instrumented application 135 of the illustrated example communicates via a network 120 to retrieve media from a media provider 110. Further, the application 135 of the illustrated example is instrumented with monitoring functionality. The monitoring functionality is selectively activated depending on whether the consent indicator is set to the appropriate state and/or present on the media device 130. In some examples, when monitoring functionality is enabled, the application 135 transmits monitoring information to the example central facility 170.

The example media provider 110 of the illustrated example of FIG. 1 includes one or more servers providing Internet media (e.g., web pages, audio, video, images, etc.). The example media provider 110 of FIG. 1 may be implemented by any provider(s) of media such as a digital media broadcaster, multicaster, or unicaster (e.g., a cable television service, a fiber-optic television service, an IPTV provider, etc.) and/or an on-demand digital media provider (e.g., an Internet streaming video and/or audio services such as Netflix®, YouTube®, Hulu®, Pandora®, Last.fm®, etc.), a web page, and/or any other provider of media. Additionally or alternatively, the example media provider 110 may not be an Internet provider. For example, the media providers may be on a private, a virtual private, and/or semi-private network (e.g., a LAN).

The example app store 112 of the illustrated example of FIG. 1 is the Apple iTunes app store. In the illustrated example, the app store 112 provides applications (e.g., apps) to users for use on the media device (e.g., an iPad). While in the illustrated example, the example app store 112 is the Apple iTunes app store, any other app store and/or repository of applications/apps may additionally or alternatively be used such as, for example, Google Play, the Windows Phone app store, the Ubuntu Software Center, etc.

The example network 120 of the illustrated example of FIG. 1 is a wide area network (WAN) such as the Internet. However, in some examples, local networks may additionally or alternatively be used. For example, multiple networks (e.g., a cellular network, an Ethernet network, etc.) may be utilized to implement the example network 120 of FIG. 1.

The example media device 130 of the illustrated example shown in FIG. 1 is a device that retrieves media from the media provider 110 for presentation. In some examples, the media device 130 is capable of directly presenting media (e.g., via a display) while, in other examples, the media device 130 presents the media on separate media presentation equipment (e.g., speakers, a display, etc.). Thus, as used herein "media devices" may or may not be able to present media without assistance from a second device. Media devices are typically consumer electronics. For example, the media device 130 of the illustrated example is a tablet such as an Apple iPad™, and thus, is capable of directly presenting media (e.g., via an integrated display and speakers). While in the illustrated example, a tablet is shown, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, etc. may additionally or alternatively be used.

The instrumented application 135 of the illustrated example of FIG. 1 is software downloadable via the Internet. As such, it is implemented as computer-readable instructions executing on a logic circuit such as a processor of the media device 130. In the illustrated example, the instrumented application 135 is provided by the media provider 110. However, the instrumented application 135 may be provided by any other entity. In some examples, the instrumented application is installed on the media device 130 by the user by downloading the instrumented application 135 from the app store 112 (e.g. Apple iTunes, Google play, etc.). The application 135 (e.g., an app) presents media retrieved from the media provider 110. In examples disclosed herein, the instrumented application 135 is implemented to include monitoring functionality provided by the monitoring entity via, for example, a software development kit (SDK). The monitoring functionality, when enabled (based on whether a consent and/or panelist identifier is stored in a shared memory), transmits monitoring information to the central facility 170. That is, a monitoring enabled application (e.g., the instrumented application 135) is to collect monitoring information if the panelist identifier is in the shared memory and to disable collection of the media monitoring information if the panelist identifier is not in the shared memory.

The example data store 150 of the illustrated example of FIG. 1 may be any device for storing data such as, for example, flash memory, magnetic media, optical media, etc. In the illustrated example, the data store 150 is random access memory of the media device 130. Furthermore, the data stored in the data store 150 may be in any data format such as, for example, binary data, comma delimited data, tab delimited data, structured query language (SQL) structures, etc. While in the illustrated example the data store 150 is illustrated as a single database, the data store 150 may be implemented by multiple databases, and/or be stored in multiple memory locations of the media device.

The example registrar 155 of the illustrated example of FIG. 1 is implemented by a processor executing instructions, but it could alternatively be implemented by an ASIC, DSP, FPGA, or other circuitry (e.g., a dedicated circuit). For example, the registrar may be a component built into the media device 130. In the illustrated example, the registrar is downloaded to the media device 130. The example registrar 155 of FIG. 1 requests permission of a user to enable monitoring. Furthermore, the example registrar 155 collects demographic information from the user (e.g., by presenting a survey to the user).

In the example of FIG. 1, an SDK kit is provided from the central facility 170 of, for example, an audience measurement entity to a media provider (e.g., an application developers) 110. The provision of this SDK can be via an electronic communication 111 over the network 120. The media provider 110 employs the SDK to generate an instrumented app 135. The media provider 110 then posts the instrumented app to the app store 112 as shown by the electronic message 113 of FIG. 1. In some examples, the instrumented app must first be approved by a third party (e.g., Apple) before it is made available in the app store 112.

Once the instrumented app 135 is made available at the app store, members of the general public, some of which are panelists of the audience measurement entity, may download the app to their respective media device(s) 130 via an electronic message 115 as shown in FIG. 1. In a separate transaction, which may be totally unrelated to the downloading of the instrumented app, the audience measurement entity may download the registrar app to the mobile device(s) of panelist(s). The registrar 155 may be an app that is downloaded in an electronic message 116 from the central facility as shown in FIG. 1 and/or may be downloaded via the app store 112 (e.g., along the same and/or a similar path as the electronic message 115). When executed, the registrar 155 asks the panelist to consent to monitoring by instrumented apps. If the panelist agrees, the registrar 155 sets a consent identifier on the mobile device in a shared memory location accessible to instrumented apps. The registrar 155 also collects demographic information and uploads the same to the central facility 170 where it is stored in association with a panelist identifier.

When an instrumented app 135 is executed on a mobile device, the instrumented app 135 accesses the shared memory location to determine if the user of the mobile device has consented to monitoring. If so, the monitoring instructions of the app 135 are executed to collect monitoring information and upload the same to the central facility via electronic message 117. If the consent identifier is not present, the monitoring instructions are disabled and the app 135 is executed without collecting monitoring information and without uploading monitoring information to the central facility 170.

The central facility 170 of the illustrated example is a facility of an audience measurement entity (e.g., the Nielsen Company (US) LLC) and includes an interface to receive reported metering information (e.g., metadata) from the media device 130 via the network 120. The example central facility 170 of the illustrated example of FIG. 1 includes an HTTP interface 175, a registration data receiver 177, a data store 176, a monitoring data receiver 179, a software development kit (SDK) provider, and a reporter 182.

In the illustrated example, the central facility 170 includes an HTTP interface 175 to receive HTTP requests that include media monitoring information, demographic information, etc. The HTTP requests are sent with the media monitoring information in their payload. The media monitoring information may include media-identifying information (e.g., media-identifying metadata, codes, signatures, watermarks, and/or other information that may be used to identify presented media), application usage information (e.g., an identifier of an application, a time and/or duration of use of the application, a rating of the application, etc.), user-identifying information (e.g., demographic information, a panelist identifier, a username, etc.), etc. The requests may not be intended to actually retrieve content, but are instead used as a vehicle to convey the metering information. Thus, the HTTP requests may be referred to as "dummy requests". The central facility 170 is provided with software (e.g., a daemon) to extract the metering information from the payload of the dummy request(s). Additionally or alternatively, any other method(s) to transfer the metering information may be used such as, for example, an HTTP Secure protocol (HTTPS), a file transfer protocol (FTP), a secure file transfer protocol (SFTP), an HTTP and/or HTTPS GET request, an HTTP and/or HTTPS POST request, etc.

The example data store 176 of the illustrated example of FIG. 1 may be any device for storing data such as, for example, flash memory, magnetic media, optical media, etc. The data store 176 of the illustrated example of FIG. 1 stores monitoring information received at the registration data receiver (e.g., demographic information transmitted by the registrar 155), and/or received at the monitoring data receiver 179 (e.g., media-identifying information, application usage information, etc.). However, the data store 176 may additionally or alternatively store any other information. Furthermore, the data stored in the data store 176 may be in any data format such as, for example, binary data, comma delimited data, tab delimited data, structured query language (SQL) structures, etc. While in the illustrated example the data store 176 is illustrated as a single database, the data store 176 may be implemented by multiple databases, and/or be stored in multiple memory locations of the media device.

The example registration data receiver 177 of the illustrated example of FIG. 1 is implemented by a logic circuit such as a processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The example registration data receiver 177 receives demographic information from the registrar application 155 on multiple media devices. The received registration/demographic information is stored in the data store 176. In some examples, the registration data receiver 177 generates panelist identifiers to be used to identify corresponding panelists. The panelist identifiers are is stored in the data store 176. The panelist identifiers may later be used to correlate media exposure and/or application usage to a particular panelist and/or demographic. In some examples, the panelist identifier is transmitted to the registrar 155 associated with the corresponding panelist as an acknowledgement of received demographic information.

The example monitoring data receiver 179 of the illustrated example of FIG. 1 is implemented by a logic circuit such as a processor executing instructions, but it could additionally or alternatively be implemented by an ASIC, a PLD, an FPLD, an analog circuit, and/or other circuitry. The example monitoring data receiver 179 receives media monitoring information from the instrumented application 135. As disclosed herein, media monitoring information may include media-identifying information (e.g., media-identifying metadata, codes, signatures, watermarks, and/or other information that may be used to identify presented media), application usage information (e.g., an identifier of an application, a time and/or duration of use of the application, a rating of the application, etc.), user-identifying information (e.g., demographic information, a panelist identifier, a username, etc.), etc. The monitoring data receiver 179 stores the received monitoring information in the data store 176.

In the illustrated example, the example monitoring data receiver 179 stores and analyzes the monitoring information received from the instrumented application(s) 135 from different media devices. For example, the example monitoring data receiver 179 may sort and/or group metering information by media provider 110 (e.g., by grouping all metering data associated with a particular media provider 110, and/or associated with a particular instrumented application 135). Any other processing of media monitoring information may additionally or alternatively be performed.

In some examples, the monitoring data receiver 179 adds a timestamp to the media monitoring information upon receipt. Timestamping (e.g., recording a time that an event occurred) enables accurate identification and/or correlation of media that was presented and/or the time that it was presented with the demographics of the user(s) of the media device(s).

The example SDK provider 180 of the illustrated example of FIG. 1 is implemented by a logic circuit such as a processor executing instructions, but it could additionally or alternatively be implemented by an ASIC, a PLD, an FPLD, an analog circuit, and/or other circuitry. The example SDK provider 180 provides instructions to application developers to facilitate creation of the instrumented application 135. In some examples, the SDK is provided such that the application developer(s) can integrate the SDK into existing applications. While in the illustrated example an SDK is provided, the monitoring components instrumented by the SDK and/or monitoring instructions provided via the SDK may be provided in any other fashion. For example, the monitoring components may be provided as an application programming interface (API), a plugin, an add-on, etc.

The example reporter 182 of the illustrated example of FIG. 1 is implemented by a logic circuit such as a processor executing instructions, but it could additionally or alternatively be implemented by an ASIC, a PLD, an FPLD, an analog circuit, and/or other circuitry. The reporter 182 generates reports indicative of media exposure metrics and/or application usage metrics based on one or more different types of client devices (e.g., personal computers, portable devices, mobile phones, tablets, etc.). For example, the reporter 270 compiles media exposure metrics based on the correlation of the media-identifying information, the application usage information, and the user-identifying information. A report is then generated to indicate media exposure and/or application usage statistics. In some examples, the exposure measurements provide ratings information for different media (e.g., a particular television show, a particular website, a particular movie, etc.) In some examples, the exposure measurements indicate ratings information and/or usage statistics for different instrumented applications.

Additionally or alternatively, popularities of different types of media across different device types may be reported. Such different types of media may be, for example, news, movies, television programming, on-demand media, Internet-based media, games, streaming games, advertisements, etc. Such comparisons may be made across any type(s) and/or numbers of devices including, for example, cell phones, smart phones, dedicated portable multimedia playback devices, iPod® devices, tablet computing devices (e.g., an iPad®), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the client device(s). Additionally or alternatively, the report may associate the media exposure metrics with metric indicators of the popularity of the artist, genre, song, title, etc., across one or more user characteristics selected from one or more demographic segment(s), one or more age group(s), one or more gender(s), and/or any other user characteristic(s).

In some examples, the media exposure metrics are used to determine demographic reach of streaming media, ratings for streaming media, engagement indices for streaming media, user affinities associated with streaming media, broadcast media, and/or any other audience measure metric associated with streaming media and/or locally stored media. While in the illustrated example, the media exposure metrics are used to provide information for streaming media, the media exposure metrics may be used to provide information for any other type of media such as, for example, websites, non-streaming media, etc. In some examples, the media exposure metrics are audience share metrics indicative of percentages of audiences for different applications and/or types of applications that accessed the same media. For example, a first percentage of an audience may be exposed to news media via a browser application, while a second percentage of the audience may be exposed to the same news media via a news reader application.

Although for simplicity, the above discussion focuses on a single media device, a single instrumented app 135, a single media provider, a single app store 112, and a single central facility 170, any number of any of these elements may be present. For example, in a typical implementation, it is expected that multiple media providers will offer multiple different instrumented apps to the public at large. Thus, it is expected that there will be many media devices accessing such apps, and that a significant portion of the users will agree to be panelists. Thus, it is expected that there will be many instances of the above processes conducted across many devices at the overlapping and/or distinct times. Thus, for example, there may be many instantiations of the machine-readable instructions disclosed in the above flowcharts operating at the same or different time. Some of these instances may be implemented as parallel threads operating on a same device.

Figure 2:
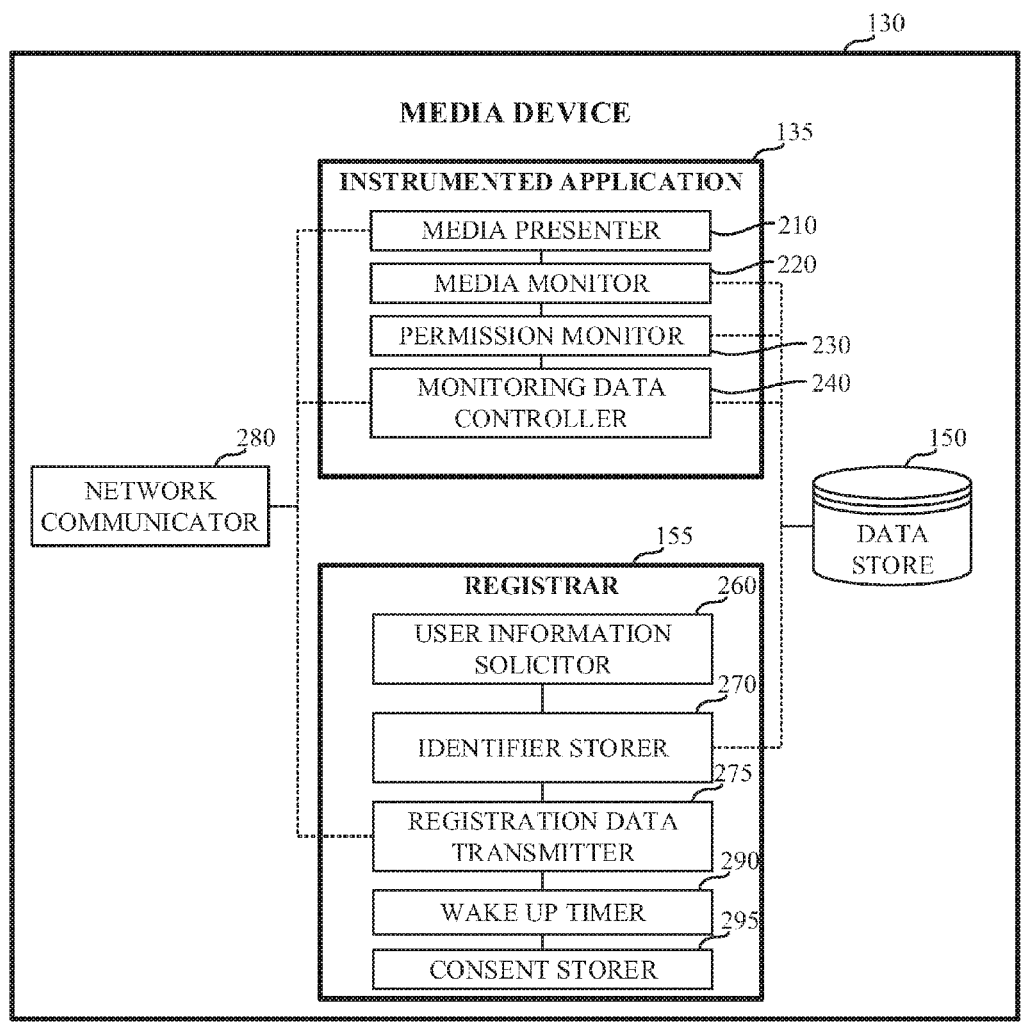
FIG. 2 is a block diagram of an example implementation of the example media device 130 of FIG. 1.

FIG. 2 is a block diagram of an example implementation the example media device 130 of FIG. 1. The example media device 130 of FIG. 2 includes the example instrumented application 135, the example data store 150, the example registrar 155, and a network communicator 280. The example instrumented application 135 of FIG. 2 includes a media presenter 210, a media monitor 220, a permission monitor 230, and a monitoring data controller 240. The example registrar 155 of FIG. 2 includes a user information solicitor 260, an identifier storer 270, a registration data transmitter 275, a wake-up timer 290, a consent storer 295.

The example media presenter 210 of FIG. 2 is implemented by computer executable instructions. In the illustrated example, the media presenter 210 interacts with a QuickTime® application programming interface (API) to display media via the media device 130. While in the illustrated example, the QuickTime® API is used, any other media presenting framework may additionally or alternatively be employed. For example, the media presenter 210 of the illustrated example may interact with an Adobe® Flash® media presentation framework.

The example media monitor 220 of the illustrated example of FIG. 2 is implemented by computer executable instructions. The media monitor 220 of FIG. 2 is downloaded with the instrumented app 135 and is initiated when the app is launched on the media device 130. The media monitor 220 of the illustrated example extracts metering data (e.g., signatures, watermarks, etc.) from the media presented by the media presenter 210. For example, the media monitor 220 can implement functionality provided by a software development kit (SDK) to extract one or more audio watermarks, one or more video (e.g., image) watermarks, etc., embedded in the audio and/or video of the media presented by the media presenter 210. (For example, the media may include pulse code modulation (PCM) audio data or other types of audio data, uncompressed video/image data, etc.)

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, the code/watermark is transmitted with and/or in association with the media as media-identifying metadata. The media-identifying metadata may be formatted in a text or binary format such as, for example, an ID3 tag. In some examples, the media-identifying metadata includes the data from the code/watermark, etc. However, in some other examples, the media-identifying metadata is derived from and/or representative of the code/watermark, and/or a signature, etc. Example methods and apparatus to transcode watermarks into ID3 tags are disclosed in U.S. patent application Ser. No. 13/341,646, U.S. patent application Ser. No. 13/341,661, U.S. patent application Ser. No. 13/443, 596, U.S. patent application Ser. No. 13/455,961, U.S. patent application Ser. No. 13/341,646, and U.S. patent application Ser. No. 13/472,170 which are hereby incorporated by reference in their entireties.

In the illustrated example of FIG. 2, the example media monitor 220 determines (e.g., extracts, transforms, derives, decodes, converts, etc.) the media-identifying metadata (e.g., such as media identifying information, source identifying information, watermarks, codes, etc.) associated with, and/or transmitted with the media (e.g., in an ID3 tag, in a Hypertext Transfer Protocol (HTTP) Live Streaming (HLS) manifest, in a Moving Pictures Experts Group version 2 (MPEG2) transport stream, in a timed text track, in an encryption key associated with the media, etc.). The media-identifying metadata may be a code in, for example, a text or binary format located in an ID3 tag associated with the media. In some examples, the media monitor 220 converts the metering data into a text and/or binary format for transmission to the central facility 170.

The example permission monitor 230 of the illustrated example of FIG. 2 is implemented by computer executable instructions. The example permission monitor 230 of the illustrated example monitors the data store 150 to determine if monitoring is to be enabled. In some examples, the permission monitor 230 monitors for presence of a consent identifier, a state of a consent identifier, and/or a panelist identifier.

The example monitoring data controller 240 of the illustrated example of FIG. 2 is implemented by computer executable instructions. In the illustrated example, the monitoring data controller 240 manages records stored in the data store 150. For example, the data controller 240 controls transmission of stored records, deletion of aged records, determining if a storage threshold of the data store 150 is exceeded, etc.

The example user information solicitor 260 of the illustrated example of FIG. 2 is implemented by machine-readable instructions, but could additionally or alternatively be implemented by a dedicated logic circuit, an ASIC, a DSP, an FPGA, and/or other analog and/or digital circuitry. The user information solicitor 260 opens a user interface asking the user to enable monitoring of their media and/or app usage. If the user declines, the user information solicitor 260 closes and, in some examples, may again open to request the user to join the panel after a period of time or, in other examples, may never ask again. If the user accepts, the user information solicitor 260 of the illustrated example solicits the user's demographics and/or other information. This information is requested once and enables monitoring across all apps having metering functionality. In the illustrated example, registration data (e.g., demographic information) is obtained from the user when the user joins (i.e., registers for) the panel. In the illustrated example, the registration data is received from a user via a user interface of the media device (e.g., a display, a touchscreen, etc.). Additionally or alternatively, the demographic information may be obtained from the user in any other way (e.g., via a telephone interview, by having the user complete an online survey, etc.). Additionally or alternatively, panelists may be contacted and/or enlisted using any desired methodology (e.g., random selection, statistical selection, phone solicitations, Internet advertisements, surveys, advertisements in shopping malls, product packaging, etc.).

The example identifier storer 270 of the illustrated example of FIG. 2 is implemented by computer executable instructions, but could additionally or alternatively be implemented by a dedicated logic circuit, ASIC, DSP, FPGA, and/or other analog and/or digital circuitry. In the illustrated example, the identifier storer 270 stores a panelist identifier in the data store 150. In some examples, the identifier storer 270 encrypts the panelist identifier prior to storing the identifier (or an encrypted form of the identifier) in the data store 150. Encrypting the panelist identifier ensures that sensitive panelist information is not exposed to applications that would otherwise attempt to gain access to sensitive panelist information. Accordingly, instrumented applications do not have access to panelist information other than the panelist identifier which, while identifying the panelist, does not identify any sensitive information about the panelist (e.g., a telephone number, an email address, a mailing address, a social security number, a credit card number, etc.).

The example registration data transmitter 275 of the illustrated example of FIG. 2 is implemented by computer executable instructions, but could additionally or alternatively be implemented by a dedicated logic circuit, ASIC, DSP, FPGA, and/or other analog and/or digital circuitry. In the illustrated example, the registration data transmitter 275 transmits registration data received via the user information solicitor 260 to the central facility 170 via the network communicator 280. In the illustrated example, when a user joins the panel, the registration data transmitter 275 contacts the central facility 170 to request a panelist identifier. However, in some examples, rather than asking the central facility 170 for the panelist identifier the registration data transmitter 275 and/or the user information solicitor 260 generates a panelist identifier. In some examples the panelist identifier is generated based on the registration data (e.g., demographic data and/or other panelist information). For example, the panelist identifier may be a telephone number associated with the panelist, a hardware address of the media device (e.g., a media access control (MAC) address, a serial number, etc.), etc. In some examples, the panelist identifier is not based on the registration data and is, instead, a random and/or pseudo-random identifier.

The example wake up timer 290 of the illustrated example of FIG. 2 is implemented by computer executable instructions, but could additionally or alternatively be implemented by a dedicated logic circuit, ASIC, DSP, FPGA, and/or other analog and/or digital circuitry. In some examples, the user may not consent to monitoring. In such an example, it may be advantageous to periodically and/or a-periodically prompt the user to give their consent. In some examples, the user may be offered incentives (e.g., cash, gift cards, goods, services, etc.) in exchange for their permission to enable monitoring. In the illustrated example, the wake up timer 290 waits for a period of time (e.g., one week, one month, two months, one year, etc.) before prompting the user for their consent to enable monitoring. In some examples, the wake up timer 290 a-periodically prompts the user based on, for example, how long the device has been powered on, an amount of data transmitted to and/or from the device, a download of a new app (instrumented or not instrumented), etc. In examples where the user has given their consent, it may further be advantageous to periodically and/or a-periodically remind the user that they have given their consent to be monitored.

The example consent storer 295 of the illustrated example of FIG. 2 is implemented by computer executable instructions, but could additionally or alternatively be implemented by a dedicated logic circuit, ASIC, DSP, FPGA, and/or other analog and/or digital circuitry. In the illustrated example, the consent storer 295 stores a consent identifier in the data store 150. In the illustrated example, the consent identifier is a binary indicator separate from the panelist identifier that indicates whether monitoring is enabled.

The example network communicator 280 of the illustrated example of FIG. 2 is an Ethernet interface. In the illustrated example, the network communicator 280 transmits data stored in the data store 150 and/or registration data received by the user information solicitor 260 to the central facility 170. The data is transmitted to the central facility 170 using one or more HTTP requests. For example, the HTTP request may be a dummy request in that it is not intended to receive data, but rather is used as a vehicle to carry monitoring data (e.g., panelist demographic information, app usage information, media identifying information, etc.) to the central facility 170. However, any other way of transmitting data may additionally or alternatively be used such as, for example, a file transfer protocol (FTP), etc.

Significantly, the registrar 155 of FIG. 2 enables a user to consent to enable media and/or app monitoring by any app with monitoring functionality (e.g., by an instrumented app). Because the consent identifier is set on the media device, any downloadable app instrumented with monitoring functionality can collect usage information after verifying the consent identifier is set to the appropriate state. Advantageously, this approach turns every such app into a software meter useful for audience measurement. Moreover, each such app/software meter may be tailored to monitor the app with which it is associated. Alternatively, the software meter may have a generic format such that all instrumented apps collect the same type(s) of data.

In some examples, the media device 130 may enable multiple profiles and/or user accounts to be used (e.g., a user account for a parent and a user account for a child). Accordingly, in such an example, the consent identifier indicates consent for profile(s) that have given consent to being monitored. For example, a first profile (e.g., a parent profile) may consent to be monitored, while a second profile (e.g., a child profile) may not. In some examples, cross-profile consent may be given. For example, a parent may give consent on behalf of the child to enable monitoring for the child profile as well. In some examples, multiple consent identifiers may be stored, each associated with a respective user account and/or profile. In other examples, a single identifier indicating which profiles and/or user accounts have given consent may be stored. In such examples, the users of the multi-user device are identified before monitoring begins to ensure only individuals who consent are monitored.

While an example manner of implementing the example media device 130 and/or the example central facility 170 are illustrated in FIGS. 1 and/or 2, one or more of the elements, processes and/or devices illustrated in FIGS. 1 and/or 2 may be combined, divided, re-arranged, omitted, eliminated and/or implemented in any other way. Further, the example HTTP interface 175, the example data store 176, the example registration data receiver 177, the example monitoring data receiver 179, the example SDK provider 180, the example reporter 182 and/or, more generally, the example central facility 170 of FIG. 1, and/or the example media presenter 210, the example media monitor 220, the example permission monitor 230, the example monitoring data controller 240, and/or, more generally, the instrumented application 135 of FIGS. 1 and/or 2, and/or the example user information solicitor 260, the example identifier storer 270, the example registration data transmitter 275, the example wake up timer 290, the example consent storer 295, and/or, more generally, the example registrar 155 of FIGS. 1 and/or 2 may be implemented by hardware, software, firmware and/or any combination of hardware, software and/or firmware. Thus, for example, any of the example the example HTTP interface 175, the example data store 176, the example registration data receiver 177, the example monitoring data receiver 179, the example SDK provider 180, the example reporter 182 and/or, more generally, the example central facility 170 of FIG. 1, and/or the example media presenter 210, the example media monitor 220, the example permission monitor 230, the example monitoring data controller 240, and/or, more generally, the instrumented application 135 of FIGS. 1 and/or 2, and/or the example user information solicitor 260, the example identifier storer 270, the example registration data transmitter 275, the example wake up timer 290, the example consent storer 295, and/or, more generally, the example registrar 155 of FIGS. 1 and/or 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example HTTP interface 175, the example data store 176, the example registration data receiver 177, the example monitoring data receiver 179, the example SDK provider 180, the example reporter 182, the example media presenter 210, the example media monitor 220, the example permission monitor 230, the example monitoring data controller 240, the example user information solicitor 260, the example identifier storer 270, the example registration data transmitter 275, the example wake up timer 290, the example consent storer 295 is/are hereby expressly defined to include a tangible computer readable storage device or storage disk such as a memory, a digital versatile disk (DVD), a compact disk (CD), a Blu-ray disk, etc. storing the software and/or firmware. Further still, the example instrumented application 135 of FIGS. 1 and/or 2, and/or the registrar 155 of FIGS. 1 and/or 2 may include one or more elements, processes and/or devices in addition to, or instead of, those illustrated in FIG. 2, and/or may include more than one of any or all of the illustrated elements, processes and devices.

Figure 3:
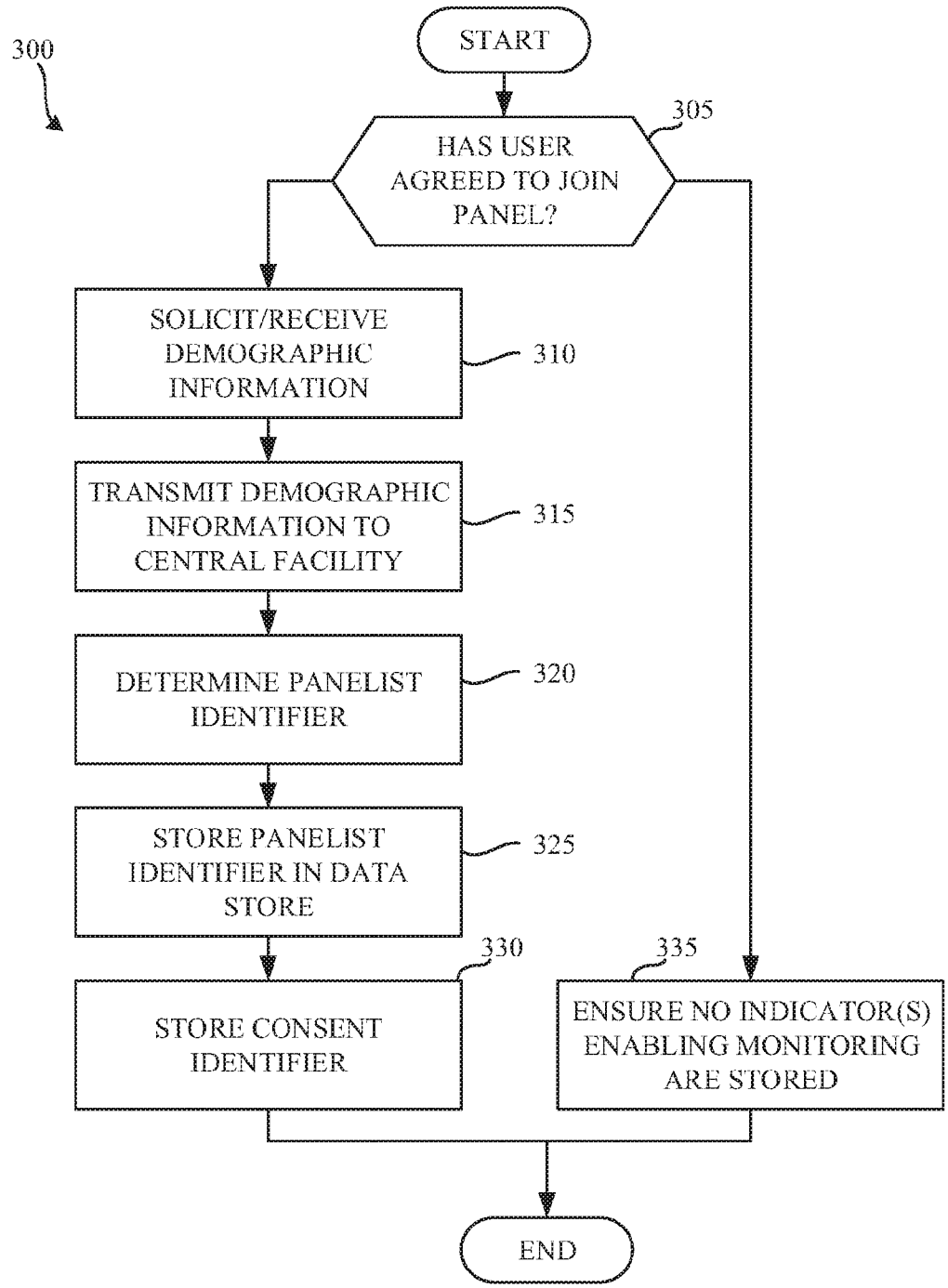
FIG. 3 is a flowchart representative of example machine-readable instructions that may be executed to implement the example registrar of FIGS. 1 and/or 2.
Figure 4:
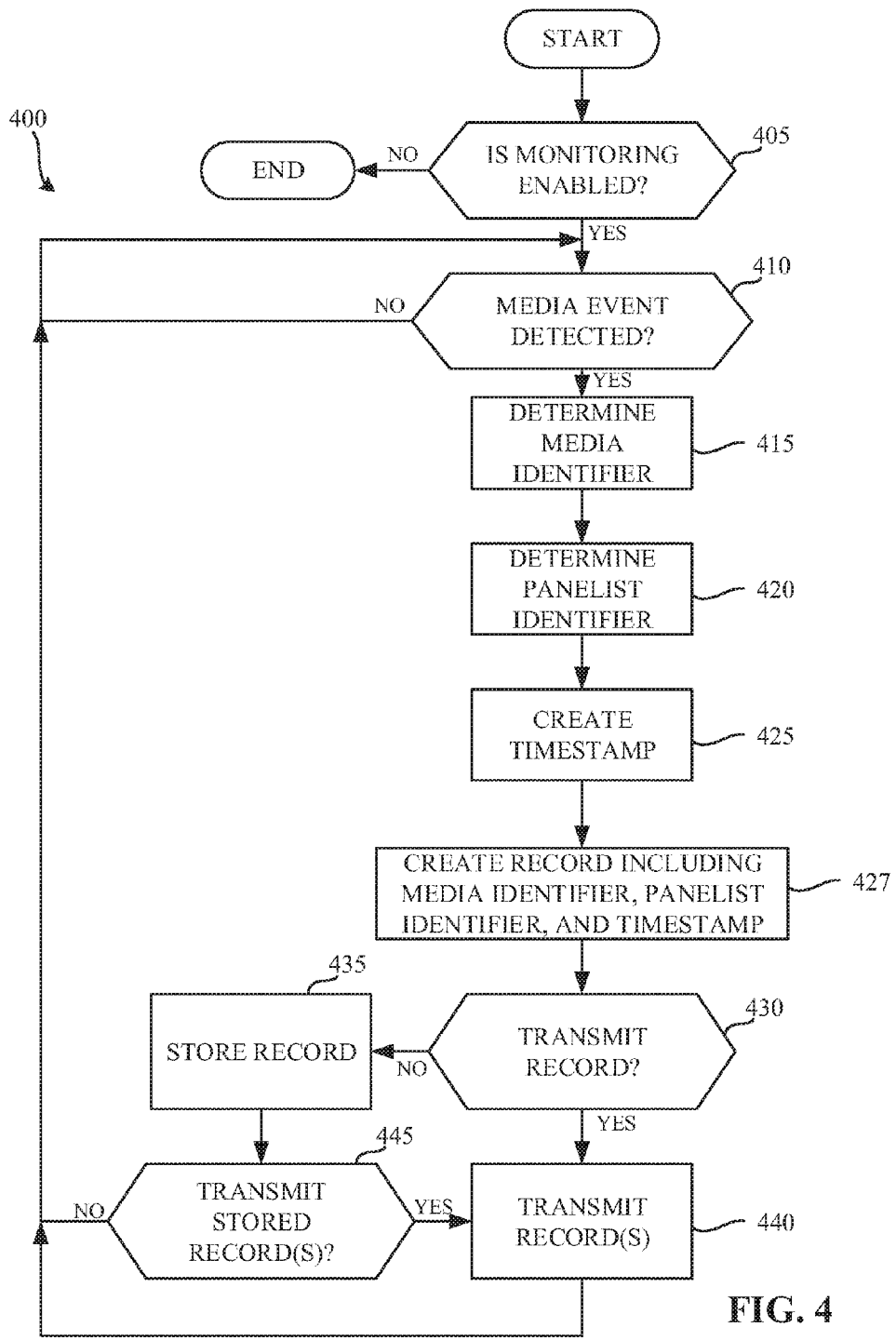
FIG. 4 is a flowchart representative of example machine-readable instructions that may be executed to implement the example instrumented application of FIGS. 1 and/or 2.
Figure 5:
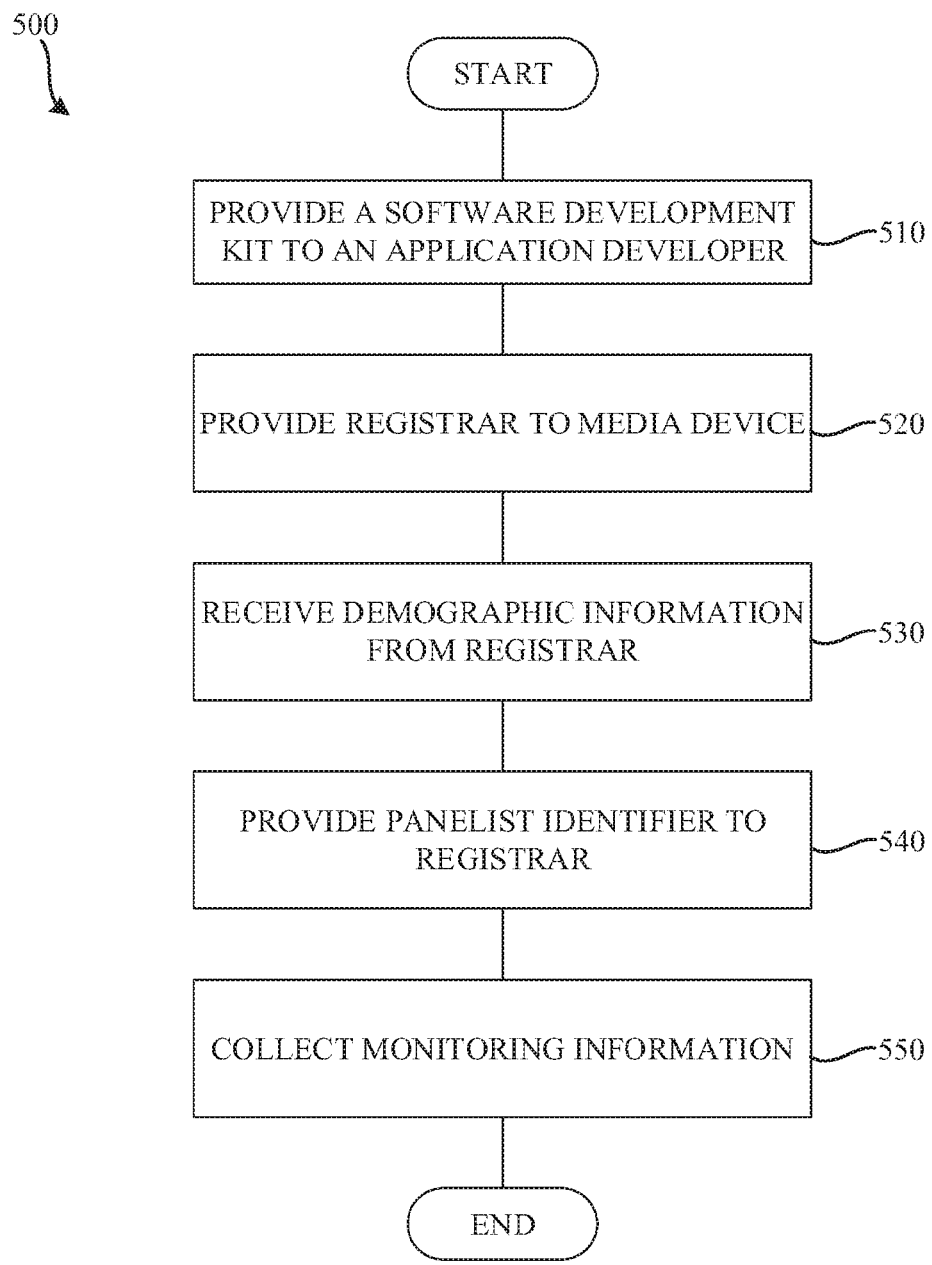
FIG. 5 is a flowchart representative of example machine-readable instructions that may be executed to implement the central facility of FIG. 1.

A flowchart representative of example machine readable instructions for implementing the registrar 155 of FIGS. 1 and/or 2 is shown in FIG. 3. A flowchart representative of example machine readable instructions for implementing the instrumented application 135 of FIGS. 1 and/or 2 is shown in FIG. 4. A flowchart representative of example machine readable instructions for implementing the central facility 170 of FIG. 1 is shown in FIG. 5. In these examples, the machine readable instructions comprise a program(s) for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) are described with reference to the flowcharts illustrated in FIGS. 3, 4, and/or 5, many other methods of implementing the example instrumented application 135, the example registrar 155, and/or the example central facility 170 may alternatively be used. For example, the order of execution of the blocks may be changed, and/or some of the blocks described may be changed, eliminated, or combined.

As mentioned above, the example processes of FIGS. 3, 4, and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 3, 4, and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

FIG. 3 is a flowchart representative of example machine-readable instructions that may be executed to implement the example registrar 155 of FIGS. 1 and/or 2. The example program 300 of FIG. 3 begins when the example registrar 155 is installed. In the illustrated example, the registrar 155 is installed via an app store (e.g., Apple iTunes, Google Play, etc.). However, the registrar 155 may be installed in any other fashion. For example, the registrar 155 may be installed by execution of an installer program. Additionally or alternatively, the example program 300 of FIG. 3 may begin when a user executes the registrar 155. In some examples, the user executes the registrar 155 by clicking on an icon of the registrar 155. Additionally or alternatively, the registrar 155 may be installed at or prior to the point of sale of the media device 130. For example, the consumer may be given a financial incentive to enable monitoring as disclosed, for example, in U.S. Patent Application Ser. No. 61/774,461, which is hereby incorporated by reference.

The user information solicitor 260 of the illustrated example determines if the user has agreed to become a panelist at block 305. In some examples, the user information solicitor 260 determines if the user has agreed to become a panelist by prompting the user to become a panelist. For example, a prompt may be displayed asking the user "Would you allow us to monitor your media exposure and/or app usage?" However, in some examples the user may have already indicated that they wish to become a panelist by, for example, agreeing to install the registrar 155. If the user has agreed to join the panel (e.g., become a panelist) (block 305), the user information solicitor 260 solicits the panelist for user identification and/or demographic data (block 310). In the illustrated example, the user information solicitor 260 collects the demographic information entered by the panelist (block 310). In the illustrated example, demographic information may include for example, an ethnicity, an income level, an address, interests of the panelist, and/or on the any other demographic information related to the panelist.

The registration data transmitter 275 transmits the collected demographic information to the central facility 170 (block 315). In the illustrated example, the demographic information is transmitted by the registration data transmitter 275 via the network communicator 280. In the illustrated example, the demographic information is transmitted immediately upon collecting the demographic data from the panelist via the user information solicitor 260. However the data may be transmitted in any other fashion. For example, the data may be stored in the data store 150 and transmitted to the central facility 170 at a later time.

The registration data transmitter 275 then determines a panelist identifier (block 320). In the illustrated example, the panelist identifier is determined by requesting the panelist identifier from the central facility 170. However, the panelist identifier may be determined in any other fashion such as, for example, by deriving the panelist identifier based on a social security number of the panelist, based on a phone number of the panelist, based on a hardware address of the media device (e.g. a media access control (MAC) address of the media device), etc. The identifier storer 270 then stores the panelist identifier in the data store 150 (block 325). In the illustrated example, the identifier storer 270 encrypts the panelist identifier before the panelist identifier (and/or an encrypted form of the panelist identifier) is stored in the data store 150. Encrypting the panelist identifier ensures that the identifier remains anonymous. For example, if a social security number of the panelist was used as the panelist identifier, the panelist identifier would include sensitive panelist information that should not be shared with other applications. However, if the sensitive panelist information (e.g., the social security number) is encrypted, the sensitive information contained therein is not identifiable by the other applications that may have access to the shared location in the data store 150.

In the illustrated example, the consent storer 295 stores a consent identifier in the data store 150 (block 330). In the illustrated example, the consent identifier is a binary indicator separate from the panelist identifier that indicates whether monitoring is enabled. However, in some examples, a consent indicator separate from the panelist identifier may not be stored. In such an example, the panelist identifier itself may serve as an indication as to whether monitoring is enabled. After storing the consent identifier to enable monitoring by instrumented apps (e.g., monitoring enabled apps), the process terminates. However, the process may be restarted anytime by executing the registrar application 155 on the media device 130. In some examples, the wake up timer 290 restarts the process 300 by prompting the user to join the panel. Prompting the user to join the panel may be advantageous because a user that was previously unreceptive to having media presentation activity and/or application usage be monitored may later give their consent to be monitored. In some examples, a second user of the device may be receptive to enabling monitoring functionality. Prompting the second user may result in the user agreeing to enabling monitoring functionality. Furthermore, the wake up timer 290 may restart the process 300 to remind the panelist that monitoring is enabled.

Referring back to block 305, if the user has not agreed to join the panel block 305, the consent storer 295 ensures that the consent identifier and/or the panelist identifier is not stored in the data store 150. The absence of such an indicator serves as a message to monitoring enabled apps that monitoring is disallowed. In some examples, the consent storer 295 deletes the panelist identifier and/or the consent identifier enabling monitoring. However in some examples, the consent storer 295 only deletes the consent identifier that enables monitoring. That is, the consent storer 295 may leave the panelist identifier in the data store. By leaving the panelist identifier in the data store, the same panelist identifier is used if the panelist later decides to rejoin the panel. In such examples, the panelist identifier may not serve as the consent identifier. After ensuring that no indicators enabling monitoring are stored (block 335), the process terminates. However, the process may be restarted anytime by executing the registrar application 155 on the media device 130.

FIG. 4 is a flowchart representative of example machine-readable instructions that may be executed to implement a monitoring enabled (e.g., instrumented) app such as the example instrumented application 135 of FIGS. 1 and/or 2. The example program 400 of FIG. 4 begins when the example instrumented application 135 is installed. In the illustrated example, the application 135 is installed via an "app store" (e.g., apple iTunes, Google Play, etc.). However, the application 135 may be installed in any other fashion. For example, the application 135 may be preinstalled on the media device (e.g., present at the time the media device was purchased). In some examples, the example program 400 of FIG. 4 begins when the example application 135 is executed. The example application 135 may be executed when, for example, a user clicks on an icon associated with the application 135. In examples disclosed herein, the instrumented application 135 is to perform a function unrelated to audience measurement (e.g., a game function, a media presentation function, a news presentation function, etc.) The application 135 may be any type of app including, for example, a game, a widget, a news reader, a browser, etc.

The permission monitor 230 of the example instrumented application 135 determines if monitoring is enabled (block 405). In the illustrated example, the presentation monitor 230 determines whether monitoring is enabled by checking the data store 150 to see if a consent identifier enabling monitoring is stored therein. In some examples, the consent identifier is a binary indicator indicating that media monitoring is enabled. However, in some other examples, the consent identifier is the panelist identifier.

If monitoring is not enabled (block 405), the process 400 terminates, as the user has not given their consent to be monitored. In some examples, a media device operating system allows a only single application to be executed at a time. Accordingly, in such examples after startup of the instrumented application 135, if the user has not given their consent to be monitored, their consent cannot be given while the instrumented application 135 is being executed. That is, the user must exit the instrumented application 135 to enable monitoring (e.g., by launching the registrar 155). In some examples, the media device operating system allows multiple applications to be executed at a time. In such an example, the permission monitor 230 may periodically determine whether the user has given their consent to be monitored. Additionally or alternatively, the permission monitor 230 may check the data store 150 to determine whether monitoring is enabled when the media monitor 220 detects a media event.

If monitoring is enabled (block 405), the media monitor 220 waits until a media event is detected. Media events may be triggered when, for example, the media presenter 210 begins playing a video, the media presenter 210 displays an image (e.g., an advertisement), the media application 135 is restarted, etc. If a media event is not detected (block 410), the media monitor 220 continues to wait for a media event.

While in the illustrated example monitoring does not occur unless permission and/or consent is given, in some examples, monitoring may occur regardless of whether permission and/or consent is given. However, the collected monitoring information is not transmitted to the central facility 170. That is, the monitoring functionality of the instrumented application 135 may operate, but not transmit collected monitoring data unless consent is received. Once consent is received (e.g., by detection of a consent and/or panelist identifier), the monitoring data controller 240 may transmit the previously collected monitoring information to the central facility 170 (as well as future monitoring information). In other words, the consent identifier may be retroactive in that it authorizes previous monitoring activity.

If a media event is detected (block 410), the media monitor 220 determines a media identifier associated with media presented by the instrumented application 135 (block 415). In the illustrated example, the media monitor 220 extracts media-identifying metadata from an ID3 tag transmitted in association with the presented media (see, for example, U.S. patent application Ser. No. 13/341,646, U.S. patent application Ser. No. 13/341,661, U.S. patent application Ser. No. 13/443,596, U.S. patent application Ser. No. 13/455,961, U.S. patent application Ser. No. 13/341,646, and U.S. patent application Ser. No. 13/472,170). In some examples, the media monitor 220 determines the media identifier by extracting, decoding, etc. a code, a signature, and/or a watermark embedded in the presented media.

The permission monitor 230 of the illustrated example, retrieves the panelist identifier from the data store 150 (block 420). In the illustrated example, the panelist identifier is an encrypted panelist identifier. Encrypting the panelist identifier ensures that the application 135 does not have access to sensitive panelist information.

The media monitor 220 then creates a timestamp (block 425). Timestamping (e.g., recording a time that an event occurred) enables accurate identification and/or correlation of media that was presented and/or the time that it was presented with the user(s) using the media device at that time. Usage of the media device may be identified in any desired manner.

The monitoring data controller 240 of the illustrated example then creates a record including the media identifier (e.g., the media identifier obtained at block 415), the panelist identifier (of block 420), and the timestamp (of block 425). In the illustrated example, the record is formatted as a comma separated value (CSV) record. However, any other type(s) and/or format(s) of record may additionally or alternatively be used. For example, the record may be formatted as an extensible markup language (XML) record.

The example monitoring data controller 260 of the illustrated example determines whether the record should be transmitted to the central facility 170 (block 430). In some examples, records are streamed to the central facility 170 as they are identified and/or created. If the example monitoring data controller 260 is to transmit the record to the central facility 170 (block 430), the network communicator 280 transmits the record to the central facility 170 (block 440). In some examples, records are stored in the data store 150 so that they may be transmitted in a single transmission (e.g., a single HTTP request, a single file transfer protocol (FTP) command, etc). If the example network communicator is not to transmit the record to the central facility 170 (block 430), the record is stored in the data store 150 by the monitoring data controller 260 (block 435).

The monitoring data controller 260 of the illustrated example determines whether a storage threshold of the data store 150 has been met or exceeded (block 445). In the illustrated example, the threshold represents an amount of time that records may be stored in the data store 150 before being transmitted to the central facility 170. Records may be stored for, for example, one hour, one day, one week, one month, etc. However, any other type of threshold may additionally or alternatively be used such as, for example, a storage limit (e.g., 1 kB, 64 kB, 1 MB, etc.). If the storage threshold is exceeded, the network communicator 280 transmits the store records to the central facility 170 (block 440). The media monitor then continues to wait for media events from the media presenter 210 (block 410). If the storage threshold is not exceeded, the media monitor 220 continues to wait for media events from the media presenter 210 (block 410).

While in the illustrated example, a storage threshold is used to determine when to transmit monitoring information, any other way of making such a determination may additionally or alternatively be used. For example, monitoring information may be transmitted to the central facility 170 at a fixed interval (e.g., 30 minutes, 3 hours, 1 day, 1 week, etc.), monitoring information may be transmitted in response to an external event (e.g., user pushes a synchronize button, the central facility 170 requests updated monitoring information, the instrumented application 135 is started, the instrumented application 135 is exited, etc.).

FIG. 5 is a flowchart representative of example machine-readable instructions that may be executed to implement the central facility 170 of FIG. 1. The example program 500 of FIG. 5 begins when the SDK provider 180 provides a software development kit (SDK) to an application developer (block 510). The SDK enables the application developer to create the instrumented application 135. In the illustrated example, monitoring functionality is provided via an SDK. However, monitoring functionality may be provided via, for example, an API, a programming library, a dynamically linked library (DLL), a plug-in, an add-on, etc.

The example HTTP interface 175 provides the registrar 155 to the media device (block 510). In the illustrated example, the registrar 155 is provided via an "app store" 112 such as, for example, Apple iTunes, Google Play, etc. In some examples, the registrar 155 is provided directly to the media device via, for example, a website, a mailed compact disc, etc. In some examples, the registrar 155 is provided to a media device manufacturer and/or reseller. In examples where the registrar 155 is provided to the media device manufacturer, the media device manufacturer may design (e.g., develop, produce, manufacture, etc.) the media device with the registrar 155 as an integrated component. In examples where the registrar 155 is provided to the reseller, the reseller may install (e.g., modify, alter, adapt, etc.) the media device to include the registrar 155 at or prior to the time of sale of the media device to the retailer and/or to the end user (e.g., the consumer).

The example registration data receiver 177 receives demographic information from the registrar 155 (block 530). In the illustrated example, the demographic information is received when the registration data transmitter 275 transmits the demographic information received from the user to the registration data receiver 177. In response to receiving the demographic information (block 530), the registration data receiver 177 generates a panelist identifier associated with the panelist. In some examples, the panelist identifier is generated based on the demographic information. The registration data receiver 177 provides the panelist identifier to the registration data transmitter 275 of the registrar 155 (block 540). The panelist identifier is then stored in a shared memory (e.g., a pasteboard) by the identifier storer 270 for use by the instrumented application 135.

The example monitoring data receiver 179 collects monitoring information (block 550). In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a panelist identifier, a username, etc.). In some examples, the collected monitoring information is correlated with the received demographic information by the reporter 182 to create media metrics and/or application usage statistics.

Figure 6:
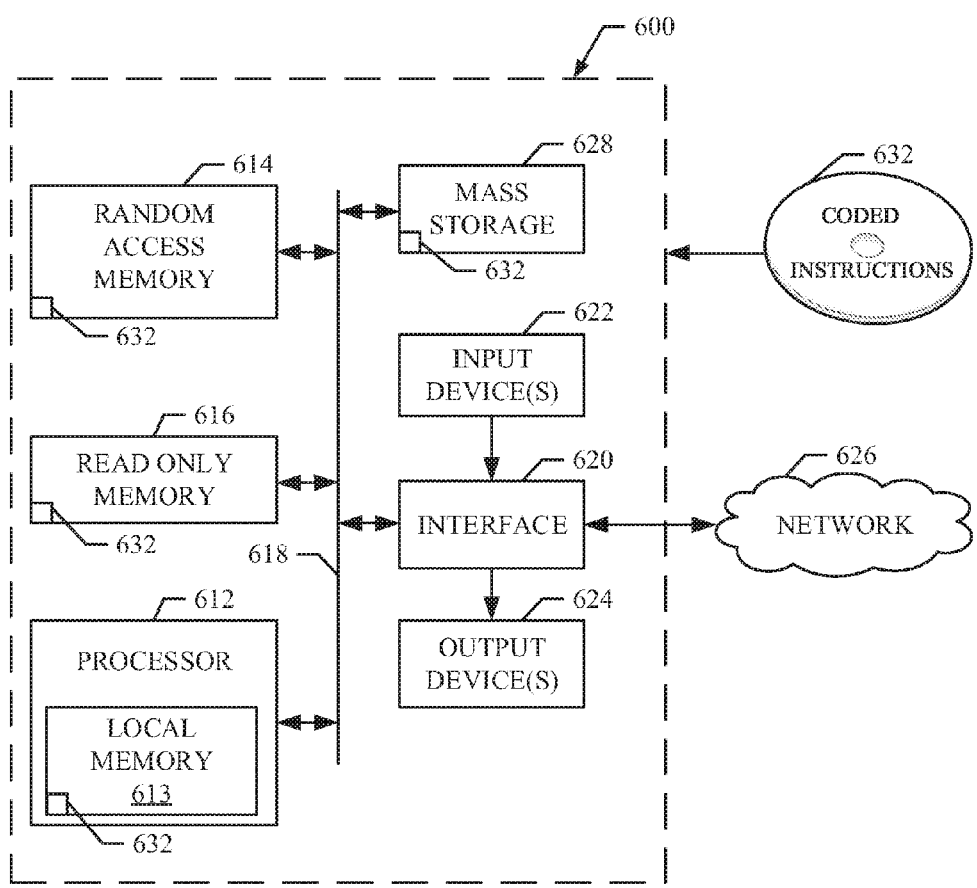
FIG. 6 is a block diagram of an example processor platform capable of executing the example machine-readable instructions of FIGS. 3 and/or 4 to implement the example registrar of FIGS. 1 and/or 2, and/or the example instrumented application of FIGS. 1 and/or 2.

FIG. 6 is a block diagram of an example processor platform 600 capable of executing the instructions of FIGS. 3 and/or 4 to implement the example registrar 155 and/or the example instrumented application 135 of FIGS. 1 and/or 2. The processor platform 600 can be, for example, a server, a personal computer, a mobile device (e.g., a cell phone, a smart phone, a tablet such as an iPad™), a personal digital assistant (PDA), an Internet appliance, a smart TV, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3 and/or 4 may be stored in the mass storage device 628, in the volatile memory 614, in the non-volatile memory 616, and/or on a removable tangible computer readable storage medium such as a CD or DVD.

Example systems disclosed herein enable monitoring usage of apps and/or exposure to media presented via apps. Disclosed example systems are advantageous in that they avoid burdening consumers with repeated requests for consent to be monitored and/or repeated requests for demographic information. Further, such example, systems enable the collection of detailed measurement data that may be tailored to the specific app instrumented with the monitoring instructions (e.g., a first set of monitoring instructions may be used for a first app and a second set of monitoring instructions, different form the first set, may be used by a second app different from the first app). Nevertheless, this different monitoring functionality on different apps can be activated by a single (i.e. same) consent identifier on a media device. Further, instrumented apps can be made available to the public at large without fear that persons who are not panelists will be monitored against their wishes. Moreover, any and/or all such instrumented apps may collect monitoring information whenever accessed by a consenting user (i.e., a panelist). The instrumented apps can, thus, be downloaded without a priori knowledge of the panelist/non-panelist status of the requesting user. Moreover, all of this monitoring can be accomplished within a tightly controlled sand box environment such as the environment provided by the iOS operating system of Apple devices. Significantly, in examples in which multiple different instrumented apps (e.g., a first instrumented app and a second instrumented app) exist, monitoring across these different apps is achieved without using a dedicated, on device meter (ODM). As a result, the audience measurement company is able to develop comparative usage metrics for different instrumented apps and/or media ratings for media accessed via different instrumented apps, even in a sandboxed environment that would not support an ODM such as those used in a traditional computer based media monitoring system such as that disclosed in Coffey, U.S. Pat. No. 5,675,510.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for monitoring a media device, the method comprising:
    collecting demographic information from a user with a registrar of a media device;
    transmitting the demographic information to a central facility from the registrar; and
    storing, with a processor executing the registrar, a panelist identifier identifying the user in a shared memory of the media device, the panelist identifier accessible to a first monitoring-enabled application and a second monitoring-enabled application, the first monitoring-enabled application and the second monitoring-enabled application separate from the registrar, the panelist identifier to be retrieved by the first monitoring-enabled application, the first monitoring-enabled application to present media, the first monitoring-enabled application to collect monitoring information if the panelist identifier is in the shared memory and to disable collection of the media monitoring information if the panelist identifier is not in the shared memory.

2. The method as described in claim 1, further including requesting, with the registrar, permission from the user to enable monitoring.

3. The method as described in claim 2, further including:
    if permission is received, storing a consent identifier enabling the collection of media monitoring information by the first monitoring-enabled application and the second monitoring-enabled application; and
    if permission is not received, at least one of not storing or deleting the consent identifier.

4. The method as described in claim 3, wherein the consent indicator enabling monitoring is the panelist identifier.

5. The method as described in claim 1, wherein the panelist identifier is based on the demographic information.

6. The method as described in claim 1, wherein the panelist identifier is requested from the central facility.

7. The method as described in claim 1, wherein the panelist identifier is an encrypted panelist identifier.

8. The method as described in claim 7, wherein the first monitoring-enabled application is not capable of decrypting the encrypted panelist identifier.

9. The method as described in claim 1, wherein the shared memory is a pasteboard.

10. The method as described in claim 1, wherein the first monitoring-enabled application is installed on the media device without reference to the user having provided consent for the first monitoring-enabled application to collect monitoring information.

11. A media device comprising:
    a registrar to receive demographic information from a user, to transmit the demographic information to a central facility, and to store a consent identifier in a data store of the media device, the consent identifier accessible to a first instrumented application and a second instrumented application executed in a sandbox environment, the consent identifier to indicate to the first instrumented application and the second instrumented application that monitoring is allowed, the registrar implemented by a processor; and the first instrumented application to access the consent identifier from the data store, the first instrumented application to present media, the first instrumented application to generate monitoring information if the consent identifier permits collection of monitoring information, the first instrumented application to not generate monitoring information if the consent identifier does not permit the collection of the monitoring information, and the first instrumented application to transmit the monitoring information to the central facility.

12. The media device as described in claim 11, wherein the registrar is to store a panelist identifier identifying a panelist associated with the media device.

13. The media device as described in claim 12, wherein the panelist identifier is received from the central facility.

14. The media device as described in claim 12, wherein the panelist identifier is determined by the registrar.

15. The media device as described in claim 11, wherein the first instrumented application is to present media via at least one of a game, a media presenter, or a news presenter.

16. The media device as described in claim 11, wherein the registrar is installed on the media device prior to a time of sale of the media device.

17. The media device as described in claim 11, wherein the first instrumented application is installed via an application store.

18. The media device as described in claim 11, wherein the first instrumented application is installed without reference to the consent identifier.

19. The media device as described in claim 12, wherein the panelist identifier is based on user-identifying information received from the panelist.

20. The media device as described in claim 19, wherein the panelist identifier is encrypted.

21. The media device as described in claim 11, wherein the registrar is installed on the media device at a time of sale of the media device.

22. A machine-readable disk or device comprising instructions which, when executed, cause a machine to at least:
collect demographic information from a user at a registrar of a media device;
transmit the demographic information to a central facility from the registrar; and
store a panelist identifier identifying the user in a shared memory of the media device, the panelist identifier accessible to a first monitoring-enabled application and a second monitoring-enabled application, the first monitoring-enabled application and the second monitoring-enabled application separate from the registrar, the panelist identifier to be retrieved by the first monitoring-enabled application, the first monitoring-enabled application to present media, the first monitoring-enabled application to collect media monitoring information if the panelist identifier is in the shared memory and to disable collection of the media monitoring information if the panelist identifier is not in the shared memory.

23. The machine-readable disk or device of claim 22, wherein the instructions, when executed, cause the machine to request permission from the user to enable monitoring.

24. The machine-readable disk or device of claim 23, wherein the instructions, when executed, cause the machine to at least:
if permission is received, store a consent identifier enabling the collection of media monitoring information by the first monitoring-enabled application and the second monitoring-enabled application; and
if permission is not received, at least one of not store or delete the consent identifier.

25. The machine-readable disk or device of claim 24, wherein the consent indicator enabling monitoring is the panelist identifier.

26. The machine-readable disk or device of claim 22, wherein the panelist identifier is based on the demographic information.

27. The machine-readable disk or device of claim 22, wherein the panelist identifier is requested from the central facility.

28. The machine-readable disk or device of claim 22, wherein the panelist identifier is encrypted.

29. The machine-readable disk or device of claim 22, wherein the shared memory is a pasteboard.

30. A method for monitoring a media device, the method comprising:
obtaining consent to enable monitoring functionality of a first monitoring-enabled application and a second monitoring-enabled application from a user, the first monitoring-enabled application and the second monitoring-enabled application being different than an application requesting the consent; and
storing, with a processor, a consent identifier indicating the consent of the user in a pasteboard of the media device, the consent identifier accessible to the first monitoring-enabled application and the second monitoring-enabled application, the consent identifier to be retrieved by the first monitoring-enabled application, the first monitoring-enabled application to collect monitoring information if the consent identifier is in the pasteboard and to disable collection of the media monitoring information if the consent identifier is not in the pasteboard.

31. The method as described in claim 30, further including requesting demographic information from the user.

32. The method as described in claim 31, further including:
transmitting the demographic information to a central facility;
generating a panelist identifier to identify the user; and
storing the panelist identifier in the pasteboard.

33. The method as described in claim 32, wherein the panelist identifier is based on the demographic information.

34. The method as described in claim 32, wherein the panelist identifier is requested from the central facility.

35. The method as described in claim 34, wherein the panelist identifier is encrypted.

36. The method as described in claim 34, wherein the first monitoring-enabled application is to transmit the panelist identifier in association with the monitoring information to the central facility.

37. The method as described in claim 36, wherein the panelist identifier is an encrypted panelist identifier, and the first monitoring-enabled application is not capable of decrypting the encrypted panelist identifier.

38. The method as described in claim 30, wherein the first monitoring-enabled application is installed on the media device without reference to the consent to enable the monitoring functionality of the first monitoring-enabled application.

39. A machine-readable disk or device comprising instructions which, when executed, cause a processor of a media device to at least:
- obtain consent to enable monitoring functionality of a first monitoring-enabled application and a second monitoring-enabled application from a user, the first monitoring-enabled application and the second monitoring-enabled application being different than an application requesting the consent; and
- store a consent identifier indicating the consent of the user in a pasteboard of the media device, the consent identifier accessible to the first monitoring-enabled application and the second monitoring-enabled application, the consent identifier to be retrieved by the first monitoring-enabled application, the first monitoring-enabled application to collect monitoring information if the consent identifier is in the pasteboard and to disable collection of the media monitoring information if the consent identifier is not in the pasteboard.

40. The machine readable disk or device as described in claim 39, wherein the instructions, when executed, further cause the processor to request demographic information from the user.

41. The machine readable disk or device as described in claim 40, wherein the instructions, when executed, further cause the processor to:
- transmit the demographic information to a central facility;
- generate a panelist identifier to identify the user; and
- store the panelist identifier in the pasteboard.

42. The machine readable disk or device as described in claim 41, wherein the panelist identifier is based on the demographic information.

43. The machine readable disk or device as described in claim 41, wherein the panelist identifier is requested from the central facility.

44. The machine readable disk or device as described in claim 43, wherein the panelist identifier is encrypted.

45. The machine readable disk or device as described in claim 43, wherein the first monitoring-enabled application is to transmit the panelist identifier in association with the monitoring information to the central facility.

46. The machine readable disk or device as described in claim 45, wherein the panelist identifier is an encrypted panelist identifier, and the first monitoring-enabled application is not capable of decrypting the encrypted panelist identifier.

* * * * *